United States Patent
Weil

[15] 3,697,628
[45] Oct. 10, 1972

[54] BENZYLATION OF TRIARYL PHOSPHATES

[72] Inventor: Edward D. Weil, Hastings-on-Hudson, N.Y.

[73] Assignee: Stauffer Chemical Company, New York, N.Y.

[22] Filed: Feb. 24, 1970

[21] Appl. No.: 13,780

[52] U.S. Cl. ............260/968, 260/45.95, 260/964, 260/965, 260/966, 252/78
[51] Int. Cl...............................C07f 9/08, C07f 9/12
[58] Field of Search...............260/964, 965, 966, 968

[56] References Cited

OTHER PUBLICATIONS

Groggens, Unit Processes in Organic Synthesis, third edition (1947) McGraw- Hill, New York, pages 725 & 726.

Olah, Friedel-Crafts and Relates Reactions, (1964) Interscience Publishes, New York, pages 428, 429, 434 & 435.

Kosolapoff et al., Chemical Abstracts, Vol. 45 (1951), page 2,855.

*Primary Examiner*—Joseph Rebold
*Assistant Examiner*—Richard L. Raymond
*Attorney*—Wayne C. Jaeschke, Martin Goldwasser and Daniel S. Ortiz

[57] ABSTRACT

Benzylation of triaryl phosphates is accomplished by reacting a triaryl phosphate with a benzyl halide in the presence of a Lewis acid.

6 Claims, No Drawings

BENZYLATION OF TRIARYL PHOSPHATES

BACKGROUND OF THE INVENTION

The benzylated triaryl phosphates are known in the art and are described in U.S. Pat. No. 3,424,714. These compounds have heretofore been prepared by reacting a benzyl substituted phenol with a phosphorus oxyhalide. Although the rate of the latter reaction can be increased by conducting it in the presence of a catalytic amount of a metal chloride, the benzyl substituted phenols employed therein are complex structures which are difficult and costly to synthesize. This is particularly true in the case of monobenzylated phenols due to the tendency of such phenols to undergo polysubstitution. Further difficulties arise from the fact that the benzylated phenols, particularly the ortho- and di-orthobenzylated phenols, are very difficult to remove from the final reaction product. They cannot be washed out with sodium hydroxide and distillation is impractical because of their high boiling points.

TECHNICAL DISCLOSURE OF THE INVENTION

The present invention relates to a process for the benzylation of triaryl phosphates. More particularly, it relates to a process for the direct benzylation of triaryl phosphates by reacting a benzyl halide with a triaryl phosphate in the presence of a Lewis acid catalyst. The compounds resulting from the process of the present invention are non-resinous liquids, useful as functional fluids and as plasticizers in various organic compositions. They are particularly effective as energy transmitting fluids, that is, hydraulic fluids, as plasticizers for polyvinyl chloride and cellulose acetate, and as flame retardants for plastics and textiles.

In accordance with the present invention, a triaryl phosphate is reacted with a benzyl halide in the presence of a Lewis acid. The term benzyl halide is meant to designate compounds having the structure:

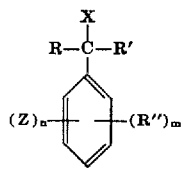

where R and R' can each be hydrogen or an alkyl group having from one to three carbon atoms; X and Z are each a halogen; R'' is lower alkyl group having from one to eight carbon atoms; and $n$ and $m$ are each numbers between 0 and 5 inclusive, such that the sum of $n$ plus $m$ cannot exceed 5. Illustrative of the benzyl compounds which can be employed in the present invention are the isomers of the following: benzyl chloride, benzyl bromide, chlorobenzyl chloride, chlorobenzyl bromide, dichlorobenzyl chloride, dibromobenzyl chloride, trichlorobenzyl chloride, tribromobenzyl bromide, tetrachlorobenzylchloride, tetrabromobenzyl bromide, pentachlorobenzyl chloride, pentabromobenzyl bromide, methylchlorobenzyl chloride, dimethylchlorobenzyl chloride, methyldichlorobenzyl chloride, methyldibromobenzyl bromide, isopropyldichlorobenzyl chloride, isopropyldibromobenzyl chloride, α-methylbenzyl chloride, α-methylbenzyl bromide, α, α-dimethylbenzyl bromide. The preferred benzyl compounds for the present invention are those in which both R and R' are hydrogen. Particularly preferred benzyl compounds are those in which R and R' are hydrogen, Z is bromine or chlorine, and $n$ is a number from 1 to 5 inclusive.

The triaryl phosphates employed in the present invention are triphenyl phosphate and the lower alkyl substituted derivatives of triphenyl phosphate. Illustrative of these compounds are: triphenyl phosphate, cresyl phosphate, trixylyl phosphate, diphenyl isopropylphenyl phosphate, phenyl bis(isopropylphenyl) phosphate, tris(isopropylphenyl) phosphate, diphenyl α-methylbenzylphenyl phosphate, diphenyl tert-butylphenyl phosphate and diphenyl chlorophenyl phosphates. Triphenyl phosphate, tricresyl phosphate, and phenyl bis (isopropylphenyl) phosphate are preferred.

The catalyst employed in the present invention is a "Lewis acid" type catalyst. The term "Lewis acid" type catalyst is meant to designate those inorganic compounds which are strong electron pair acceptors. These compounds are well known in the art and are illustrated by the following: ferric chloride, aluminum chloride, zinc chloride, molybdenum pentachloride, titanium tetrachloride, antimony trichloride or pentachloride, stannic tetrachloride and boron trifluoride. The preferred catalysts for the present invention are ferric chloride, zinc chloride and molybdenum pentachloride. These catalysts are employed in amounts from about 0.01 to about 5 percent by weight of the entire reaction mixture and preferably 0.05 to about 2 percent.

The reaction of the present invention can be carried out over a wide temperature range depending upon the particular reactants and catalyst involved. Normally, the temperature is maintained in the range of from about 100° to about 250°C. The preferred temperature range is from about 120° to about 250°C.

Normally, the reaction will be carried out over a time range of from about one-half hour to about 48 hours and preferably from 2 to 24 hours, depending upon the particular catalyst and temperature employed. The more active the catalyst and/or the higher the temperature, the shorter will be the reaction time necessary to give optimum results.

The molar ratio of benzyl halide to triaryl phosphate will determine the degree of benzylation. Therefore, if the monobenzylated product is desired, an equimolar mixture of the benzyl halide and triaryl phosphate is employed. The reaction product will then be a mixture containing a major proportion of monobenzylated triaryl phosphates, along with some polybenzylated products. If the dibenzylated, tribenzylated or higher benzylated products are desired, a higher benzyl halide to phosphate ratio should be employed. The reaction product will also contain polybenzylated phosphate isomers in which benzylation of a benzyl group already attached to an aryl group occurs in a piggyback fashion unless, of course, the benzyl compound had $n$ equal to 5.

The products obtained by the process of the present invention are easily separated from any unreacted starting materials by simple distillation and/or washing in an aqueous or alkali solution. The catalyst is removable by washing with water or an aqueous acid or alkali solution, by distilling or both.

The present invention will be further illustrated by the following examples:

EXAMPLE 1

An equimolar mixture of benzyl chloride and triphenyl phosphate is prepared by adding 126 grams of benzyl chloride to 326 grams of triphenyl phosphate in a reaction vessel fitted with a thermometer and stirrer. To this is added 0.5 percent by weight of the reactant mixture (2 grams) of zinc chloride. The reactants are then heated to 165° to 195°C. for 8 hours with stirring. Approximately 1 mole of hydrogen chloride is evolved over this period of time. The liquid product is washed with water and then dried over soda ash. The resulting product, a nearly colorless liquid is shown (by nuclear magnetic resonance) to contain approximately 1 benzyl group per triphenyl phosphate moiety. A mass spectroscopy shows the product to be a mixture of phosphates having from zero to seven benzyl groups per triphenyl phosphate group. Part of the product is fractionally distilled for purposes of characterization. The cut taken between 250°C. and 308°C. (1.5–1.6 mm) is shown by mass spectroscopy to be principally the monobenzylated triphenyl phosphate. The higher boiling 308° to 364°C. (0.04 mm) cut is similarly shown to be the dibenzylated product. Both the mono- and dibenzylated triphenyl phosphates are clear colorless liquids which are thermally stable at 350°C. The crude undistilled product after washing and drying as described above is found to be stable upon heating to 350°C. and has an autoignition temperature of 1,150°F. It is thus suitable for use as a thermally stable, fire-resistant hydraulic fluid. It is also found to be compatible with polyvinyl chloride at 40 p.p.h. and is therefore effective as a plasticizer.

EXAMPLES 2–8

A variety of Lewis acid catalysts are employed in the process of the present invention in the manner described in Example 1 with the exception that the reaction is terminated after 2 hours. The percentage conversion of the triaryl phosphate to the benzylated triaryl phosphate is determined by the amount of hydrogen chloride released. The results are contained in Table I.

TABLE I

| Example No. | Catalyst | % by weight | % Conversion |
|---|---|---|---|
| 2 | None | 0 | 0 |
| 3 | FeCl$_3$ | 1.0 | 75 |
| 4 | AlCl$_3$ | 1.0 | 17 |
| 5 | BF$_3$ (ether adduct) | 1.0 | 1.0 |
| 6 | ZnCl$_2$ | 1.0 | 61 |
| 7 | MoCl$_5$ | 1.0 | 61 |
| 8 | TiCl$_4$ | 1.0 | 15 |

EXAMPLE 9

By means of the procedure described in Example 1, 252 grams of benzyl chloride is added to 326 grams of triphenyl phosphate and 5 grams of ferric chloride. The reactant mixture is heated to 110° to 130°C. and maintained for 4 hours. Mass spectroscopy and nuclear magnetic resonance show the main major component of the reaction product to be bis(benzylphenyl) phenyl phosphate. The reaction mixture also contains minor proportions of benzylbenzylphenyl diphenyl phosphate and various other polybenzylated triphenyl phosphates having from 2 to 7 benzyl groups per phosphate.

EXAMPLE 10

By means of the procedure described in Example 1, 195 grams of benzyl chloride is added to 369 grams of phenyl bis(isopropylphenyl) phosphate and 5 grams of molybdenum pentachloride. The reactants are heated to 130° to 145°C. for 4 hours. The major component of the reaction product is shown by mass spectroscopy and nuclear magnetic resonance to be benzylphenyl bis(isopropylphenyl) phosphate.

EXAMPLE 11

An equimolar mixture of a commercially available mixture of dichlorobenzyl chloride isomers and triphenyl phosphate is prepared by mixing 195 grams of commercial mixed isomers of dichlorobenzyl chloride with 326 grams of triphenyl phosphate in a vessel fitted with a thermometer and stirrer. To this is added 5 grams of ferric chloride. The reactant mixture is heated to 180° to 200°C. for 8 hours. The product is purified by washing with 2 percent sodium hydroxide, then with water and finally stripping to 100°C. at 1 millimeter pressure. The resulting product is shown by a nuclear magnetic resonance and mass spectroscopy to be dichlorobenzylphenyl diphenyl phosphate.

EXAMPLE 12

The procedure of Example 10 is repeated with the exception that 300 grams of an isomeric mixture of trichlorobenzyl chlorides is substituted for the benzyl chloride. The major component of the reaction product is trichlorobenzylphenyl bis(isopropylphenyl) phosphate, with minor amounts of various polytrichlorobenzylated phenyl bis (isopropylphenyl) phosphates also being present. This crude reaction product is found to be suitable for use as a hydraulic fluid.

EXAMPLE 13

Using the procedure of Example 1, 223 grams of an isomeric mixture of dimethylbenzyl chloride is added to 326 grams of triphenyl phosphate and 5.5 grams of zinc chloride. The reactants are heated to 120° to 130°C. for 4 hours yielding a reaction product in which the major component is the isomers of dimethylbenzyl phenyl diphenyl phosphate.

EXAMPLE 14

The procedure of Example 1 is repeated with the exception that 239 grams of benzyl bromide is substituted for the benzyl chloride. When the reaction is allowed to proceed until approximately 1 mole of hydrogen bromide has been evolved, the resulting reaction product is essentially identical to that obtained in Example 1.

EXAMPLE 15

Using the procedure of Example 1, 286 grams of dibromobenzyl bromide is added to 371 grams of tricresyl phosphate and 7 grams of ferric chloride. The reactants are heated to 160° to 175°C. for 12 hours, yielding a reaction product in which the major component is an isomeric mixture of dibromobenzylcresyl dicresyl phosphate.

What is claimed is:

1. A process for the production of benzylated triaryl phosphates which comprises: reacting a triphenyl phosphate or lower alkyl substituted derivative thereof with a benzyl compound having the formula:

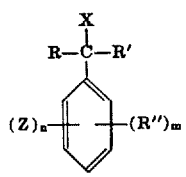

wherein R and R' are each selected from the group consisting of hydrogen and alkyl having from one to three carbon atoms; X and Z are each halogen, R'' is an alkyl group having from one to eight carbon atoms, $n$ and $m$ are each numbers between 0 and 5 inclusive such that the sum of $n$ plus $m$ does not exceed 5; and said reaction being conducted in the presence of a Lewis acid catalyst at a temperature in the range from about 100° to about 250°C.

2. The process according to claim 1 wherein the benzyl compound has a formula in which R and R' are both hydrogen.

3. The process according to claim 2 wherein the benzyl compound is benzyl chloride.

4. The process according to claim 1 where Z is a halogen and $n$ is a number between 1 and 5 inclusive.

5. The process according to claim 4 wherein the benzyl compound is dichlorobenzyl chloride.

6. The process according to claim 4 wherein the benzyl compound is trichlorobenzyl chloride.

* * * * *